United States Patent
Kim et al.

(10) Patent No.: US 7,812,915 B2
(45) Date of Patent: Oct. 12, 2010

(54) METHOD OF FABRICATING LIQUID CRYSTAL DISPLAY DEVICE

(75) Inventors: Jeong Hyun Kim, Kunpo-shi (KR); Hyun Sang Chung, Kunpo-shi (KR)

(73) Assignee: LG. Display Co., Ltd., Seoul (KR)

( * ) Notice: Subject to any disclaimer, the term of this patent is extended or adjusted under 35 U.S.C. 154(b) by 0 days.

(21) Appl. No.: 10/330,663

(22) Filed: Dec. 27, 2002

(65) Prior Publication Data

US 2004/0125324 A1    Jul. 1, 2004

(30) Foreign Application Priority Data

Dec. 24, 2001    (KR) .................... 10-2001-0084073

(51) Int. Cl.
*G02F 1/1339*    (2006.01)
(52) U.S. Cl. ..................................... 349/155
(58) Field of Classification Search ................. 349/155
See application file for complete search history.

(56) References Cited

U.S. PATENT DOCUMENTS

| | | | |
|---|---|---|---|
| 4,941,736 A * | 7/1990 | Taniguchi et al. | 349/173 |
| 5,378,502 A * | 1/1995 | Willard et al. | 427/305 |
| 5,574,581 A * | 11/1996 | Shimizu et al. | 349/89 |
| 5,680,189 A * | 10/1997 | Shimizu et al. | 349/123 |
| 5,739,882 A * | 4/1998 | Shimizu et al. | 349/123 |
| 5,919,532 A * | 7/1999 | Sato et al. | 428/1.6 |
| 6,177,214 B1 * | 1/2001 | Yokoyama et al. | 430/7 |
| 6,200,646 B1 * | 3/2001 | Neckers et al. | 427/510 |
| 6,399,257 B1 * | 6/2002 | Shirota et al. | 430/7 |
| 6,501,527 B1 * | 12/2002 | Hirose et al. | 349/155 |
| 6,705,584 B2 * | 3/2004 | Hiroshima et al. | 249/155 |
| 6,812,990 B1 * | 11/2004 | Hofmann et al. | 349/156 |
| 7,102,722 B2 * | 9/2006 | Kim et al. | 349/155 |
| 2002/0027300 A1 * | 3/2002 | Hartmann et al. | 264/1.1 |
| 2002/0106661 A1 * | 8/2002 | Virtanen | 435/6 |

* cited by examiner

*Primary Examiner*—Timothy Rude
(74) *Attorney, Agent, or Firm*—Brinks Hofer Gilson & Lione

(57) ABSTRACT

A method of fabricating a liquid crystal display includes aligning a mask on a substrate, applying surface treatment to the substrate using light that has passed through the mask, forming a spacer pattern at the surface treated area, and forming a spacer by hardening the spacer pattern. Surface treatment is applied to the area where a spacer is to be formed by an ion beam, ultraviolet radiation or a laser beam. By forming the spacer at the surface treated area using an ink jet, it is possible to control the shape and height of the spacer. Also, since the ink jet is located at the surface treated area, it become easier to align the ink jet to accurately form the spacer at the desired place.

5 Claims, 11 Drawing Sheets

METHOD OF FABRICATING LIQUID CRYSTAL DISPLAY DEVICE

BACKGROUND OF THE INVENTION

1. Field of the Invention

This invention relates to a method of fabricating a liquid crystal display, and more particularly to a method of fabricating a liquid crystal display that is capable of having a spacer formed at the correct position with a desired shape and height.

2. Description of the Related Art

Generally, a liquid crystal display LCD controls the light transmittance of liquid crystal cells in accordance with video signals to display a picture corresponding to the video signals on a liquid crystal display panel where the liquid crystal cells are arranged in a matrix type.

For this, the liquid crystal display includes a liquid crystal display panel where liquid crystal cells are arranged in a matrix type and a driving circuit for driving the liquid crystal display panel. The liquid crystal display panel has pixel electrodes and a reference electrode, that is, a common electrode provided for applying electric field to each liquid crystal cell.

Normally, the common electrode is formed on the entire surface of an upper substrate to be integrated while the pixel electrode is formed on a lower substrate by liquid crystal cells. Each of the pixel electrodes is connected to a thin film transistor TFT used as a switching device. The pixel electrode together with the common electrode drives the liquid crystal cell according to data signals supplied through the TFT.

Referring to FIG. 1, a conventional LCD includes an upper plate consisting of a black matrix 32, a color filter 30, a common electrode 28, a column spacer 26 and an upper alignment film 34, which are sequentially formed on an upper substrate 11; a lower plate consisting of a TFT, a pixel electrode 22 and a lower alignment film 24, which are formed on a lower substrate 1; and liquid crystal 40 interposed into an internal space provided by the upper plate, the lower plate and a column spacer 26.

In the upper plate, the black matrix 32 is formed in a matrix type on the upper substrate 11 and divides the surface of the upper substrate 11 into a plurality of cell areas where color filters 30 are to be formed for preventing light interference between adjacent cells. The color filters 30 of the three primary colors red, green, blue are sequentially formed on the upper substrate 11 where the black matrix 32 is formed. The common electrode 28, to which ground potential is supplied, is formed on the upper substrate 11 where the black matrix 32 and the color filter 30 are formed. On the common electrode 28, the column spacer 26 is formed at the area corresponding to the black matrix 32. The column spacer 26 provides a space into which the liquid crystal 40 is interposed between the upper plate and the lower plate. The upper alignment film 34 is formed to cover the column spacer 26 and the common electrode 28.

The TFT, which switches the driving of the liquid crystal cells in the lower plate, includes a gate electrode 6 connected to a gate line (not shown), a source electrode 8 connected to a data line (not shown), and a drain electrode 10 connected to the pixel electrode 22 through a contact hole. Also, the TFT further includes a gate insulation film 12 for insulating the gate electrode 6 from the source electrode 8 and the drain electrode 10, and semiconductor layers 14 and 16 for forming a conductive channel between the source electrode 8 and the drain electrode 10 by gate voltage supplied to the gate electrode 6. The TFT selectively supplies data signals from the data line to the pixel electrode 22 in response to the gate signal from the gate line.

The pixel electrode 22 is located at the cell area, which is divided by the data line and the gate line, and formed of transparent conductive material with good light transmittance. The pixel electrode 22 is formed on the protective film 18, which is spread on the entire surface of the lower substrate 1, and electrically connected with the drain electrode 10 through the contact hole, which is formed in the protective film 18. The lower alignment film 24 is spread on the lower substrate 1 on which the pixel electrode 22 is formed, and then a rubbing process is carried out to complete the lower plate.

Lastly, the upper plate and the lower plate, prepared separately as stated above, are placed in the correct position to be bonded together, then the liquid crystal 40 is interposed into a liquid crystal space prepared by the column spacer 26 and sealed to complete the liquid crystal display.

A fabricating process of the upper plate with such a composition is described in conjunction with FIGS. 2a to 2g.

First, on the upper substrate 11 is deposited and patterned an opaque resin or an opaque metal such as chrome Cr to form the black matrix 32 as illustrated in FIG. 2a. By spreading a material, which transmits a light of a specific wavelength (red, green or blue), on the upper substrate 11 where the black matrix 32 is formed, and patterning the material, the color filters 30a, 30b, 30c of the three primary color are formed as illustrated in FIG. 2b. A transparent metal layer is deposited on the upper substrate 11, where the black matrix 32 and the color filters 30a, 30b, 30c are formed, to form the common electrode 28 as illustrated in FIG. 2c. A mixture of solvent, binder, monomer, photoinitiator etc. . . . is printed on the upper substrate 11 where the common electrode 28 is formed, and then dried. Accordingly, the solvent among the mixed materials is evaporated to form a paste 26a where the binder, the monomer and the photoinitiator etc. . . . , as illustrated in FIG. 2d.

In the upper part of the upper substrate 11 where the paste 26a is formed, a photo mask 38 with a shielding part 38a and a transmitting part 38b is positioned, as illustrated in FIG. 2e. The paste 26a is selectively irradiated with ultraviolet radiation to be exposed via the photomask 38. If light irradiates the paste 26a through the photo mask 38, the photoinitiator is resolved to form a radical. The radical polymerizes the combinations of monomer distributed among the binders to maintain the viscosity of the exposed paste 26a. Then, the exposed paste 26a is developed by a developing solution. The non-exposed paste is then eliminated and the exposed paste remains in the paste 26a. When the remaining paste 26a is plasticized, the column spacer 26 is formed with a specific height, as shown in FIG. 2f. Polyimide is spread on the entire surface of the upper substrate 11, where the column spacer 26 is formed, to form the upper alignment film 34 on the upper substrate 11, as shown in FIG. 2g.

The column spacer 26 of the conventional liquid crystal display takes up approximately 2% of the entire area of the upper substrate 11. This is a relatively large amount of area. Thus, the column spacer 26 is formed from 2% of the entire area of the upper substrate 11, the column spacer material is printed on the entire surface of the upper substrate 11 where the color filter 30a, 30b, 30c are formed, and the column spacer must go through exposure, development and plasticization processes.

Accordingly, the column spacer forming process is not only complicated, but the material cost and fabricating cost are also high relative to the occupied area.

In order to resolve such problems, an ink jet is used to form the spacer. The ink jet is arranged on the upper substrate 11, then the spacer material is dropped onto the ink jet to form the spacer on the upper substrate 11. However, when the spacer material falls onto the upper substrate 11 a spreading phenomenon occurs making it difficult to locate the spacer at the correct position with the desired shape and height.

SUMMARY OF THE INVENTION

Accordingly, it is an object of the present invention to provide a method of fabricating a liquid crystal display that is capable of having a spacer formed at the correct position with a desired shape and height.

In order to achieve these and other objects of the invention, a method of fabricating a liquid crystal display according to an aspect of the present invention includes aligning a mask on a substrate; applying surface treatment to the substrate using light impinging on the substrate that has impinged on the mask to form a surface treated area; forming a spacer pattern at the surface treated area; and forming a spacer by hardening the spacer pattern.

The method further includes forming a black matrix on the substrate; forming a color filter on the substrate where the black matrix is formed; and forming a common electrode on the substrate where the color filter is formed.

Herein, the method further includes aligning the mask with the upper part of the substrate where the common electrode is formed.

Herein, the method further includes aligning the mask such that a transmitting part of the mask is located at the area corresponding to the black matrix and a shielding part of the mask is located at an area other than the area corresponding to the black matrix.

Herein, the method further includes limiting a width of the transmitting part of the mask to approximately 1-10 µm.

Herein, the method further includes setting the width of the transmitting part of the mask to approximately 5 µm.

The method further includes forming an alignment film on the substrate where the spacer is formed.

Herein, the method further includes aligning the mask with the upper part of the substrate where the alignment film is formed.

Herein, the method further includes aligning the mask such that a transmitting part of the mask is located at the area corresponding to the black matrix and a shielding part of the mask is located at an area other than the area corresponding to the black matrix.

Herein, the method further includes limiting a width of the transmitting part of the mask to approximately 1-10 µm.

Herein, the method further includes setting the width of the transmitting part of the mask to approximately 5 µm.

Herein, the method further includes setting the spacer pattern and the surface treated area to be either identically hydrophilic or identically hydrophobic.

Herein, the method further includes hardening the spacer pattern such that the spacer pattern accumulates onto the surface treated area to be formed when the spacer pattern is hardened.

Herein, the method further includes forming the spacer pattern on the substrate using an ink jet head nozzle.

BRIEF DESCRIPTION OF THE DRAWINGS

These and other objects of the invention will be apparent from the following detailed description of the embodiments of the present invention with reference to the accompanying drawings, in which.

DETAILED DESCRIPTION OF THE PREFERRED EMBODIMENT

With reference to FIGS. 3a to 5h, there are explained preferred embodiments of the present invention as follows.

FIG. 3a to 4c are sectional views representing a method of forming a spacer according to the first embodiment of the present invention.

Figure 1:
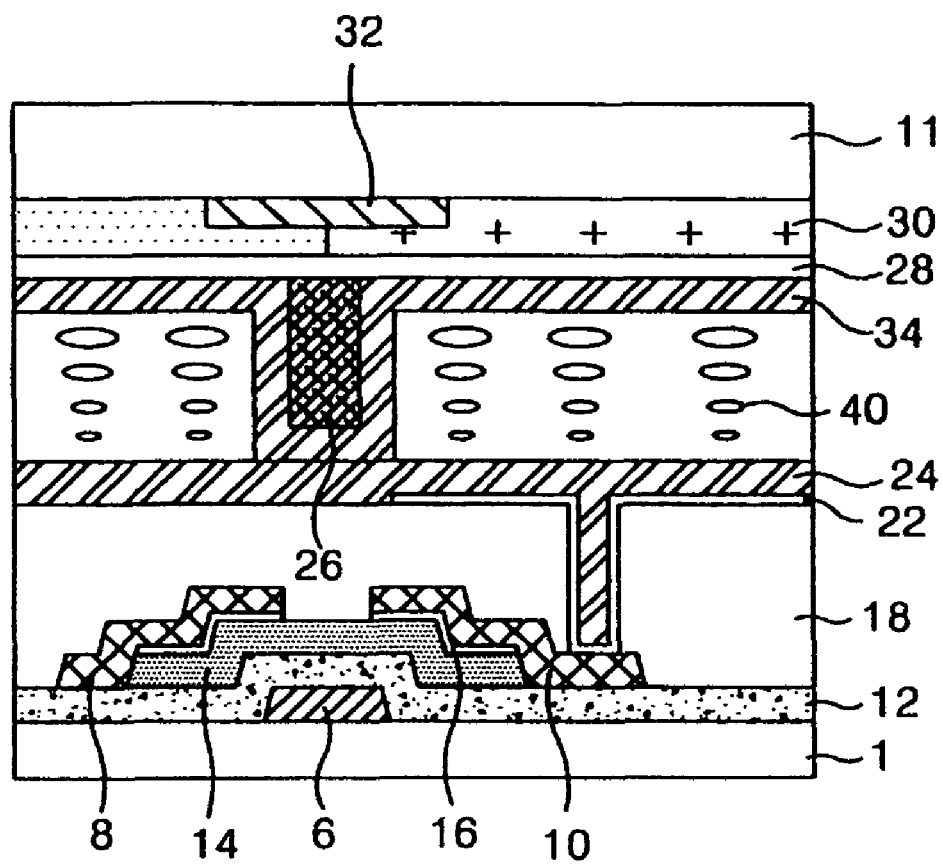
FIG. 1 is a sectional view representing a conventional liquid crystal display.
Figure 2A:
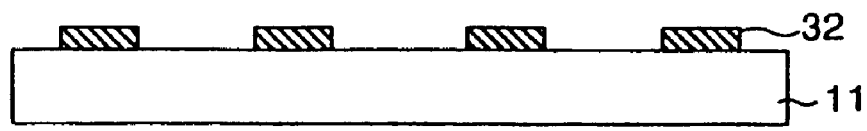
FIGS. 2a to 2g are sectional views representing a fabricating process of an upper plate illustrated in FIG. 1.
Figure 2B:
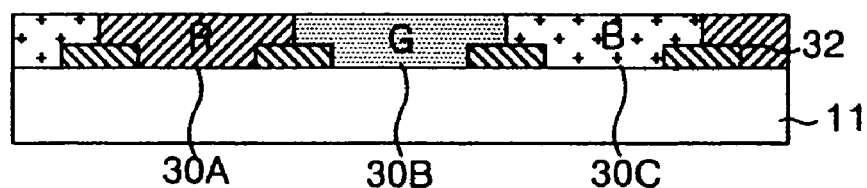
Figure 2C:
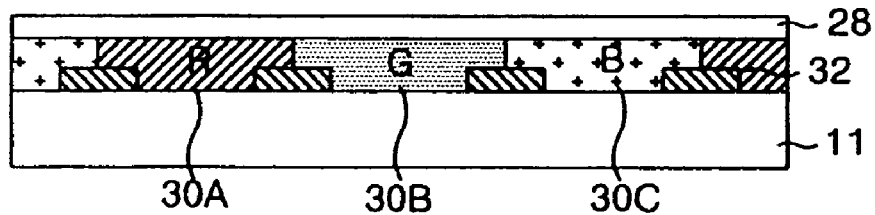
Figure 2D:
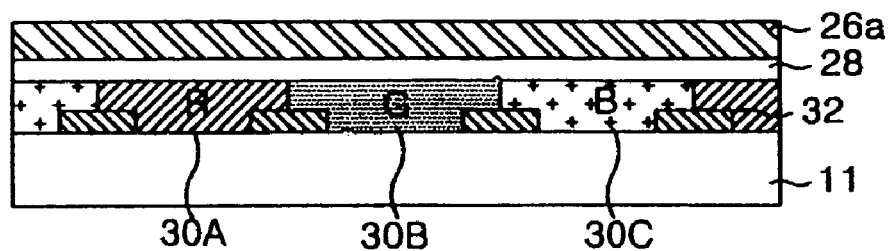
Figure 2E:
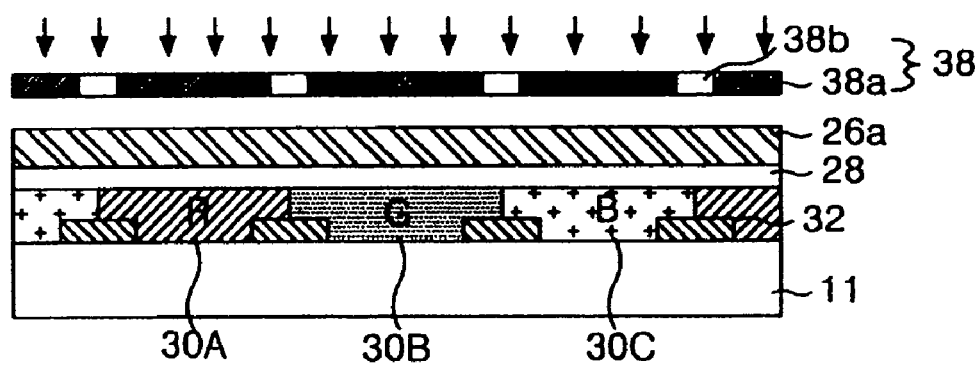
Figure 2F:
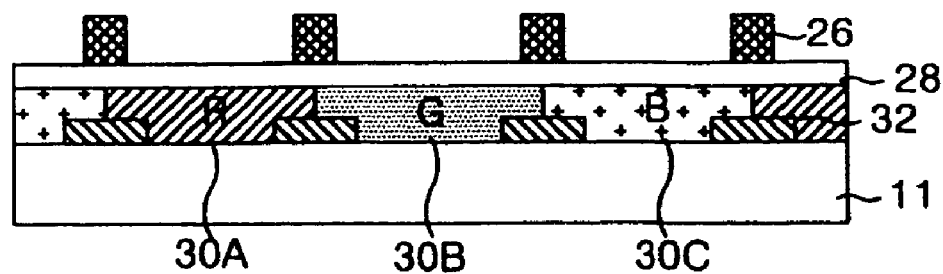
Figure 2G:
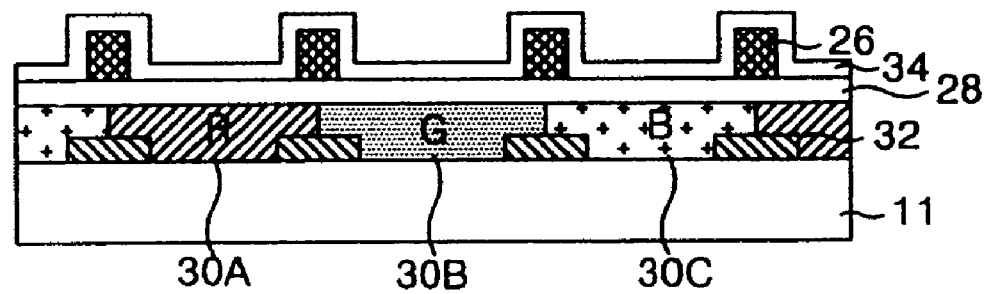
Figure 3A:
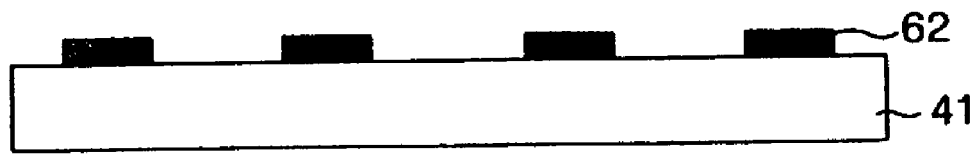
FIGS. 3a to 3h are sectional views representing a fabricating method of an upper plate according to the first embodiment of the present invention.

Referring to FIG. 3a, a black matrix 62 is formed on an upper substrate 41. For this, on the upper substrate 41 is deposited and patterned an opaque resin or an opaque metal such as chrome Cr. Subsequently, the opaque resin or the opaque metal layer are patterned by a photolithography process including an etching process to form the black matrix 62 on the upper substrate 41.

Figure 3B:
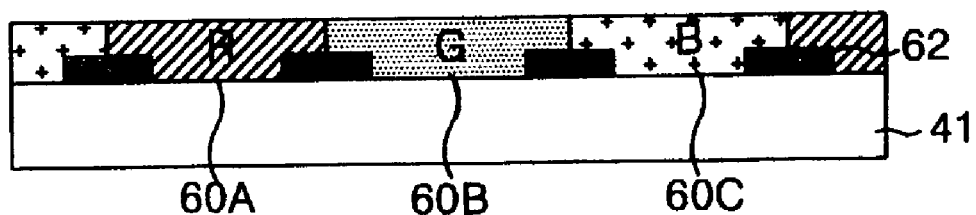

Referring to FIG. 3b, color filters 60a, 60b, 60c of the three primary colors are formed on the upper substrate 41 where the black matrix 62 is formed. For this, the color filters 30a, 30b, 30c of the three primary color are formed by spreading a material, which transmits light of a specific wavelength (red, green or blue), on the upper substrate 41 where the black matrix 62 is formed, and patterning the material.

Figure 3C:
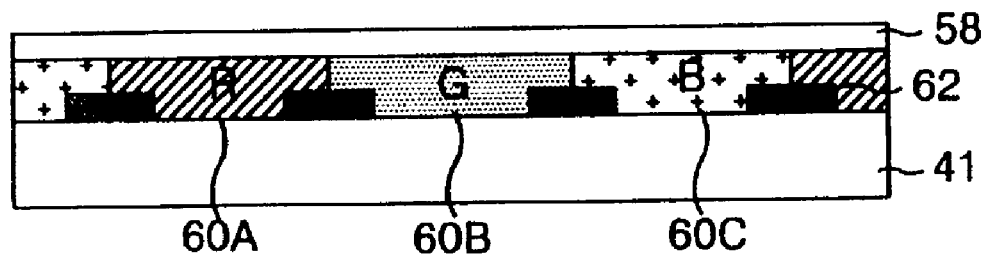

Referring to FIG. 3c, a common electrode 58 is formed on the upper substrate 41 where the color filters 60a, 60b, 60c are formed. For this, a transparent metal layer is deposited on the upper substrate 41, where the black matrix 62 and the color filters 60a, 60b, 60c are formed, to form the common electrode 58. The transparent metal layer be Indium-tin-oxide ITO, indium-zinc-oxide IZO or indium-tin-zinc-oxide ITZO, for example.

Figure 3D:
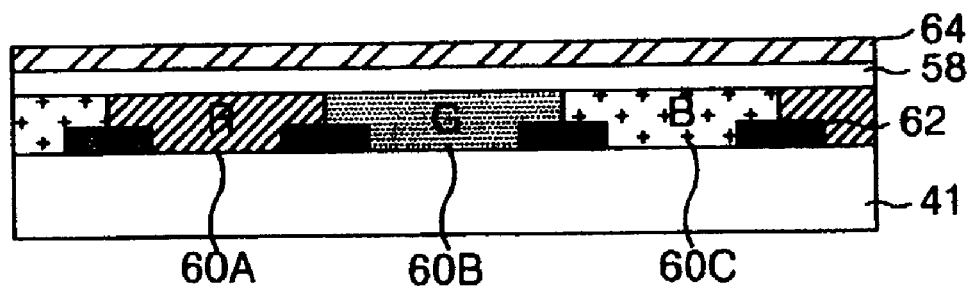

Referring to FIG. 3d, an upper alignment film 64 is formed on the upper substrate 41 where the common electrode 58 is formed.

The upper alignment film 64 is formed by spreading polyimide on the entire surface of the upper substrate 41 where the common electrode 58 is formed.

Figure 3E:
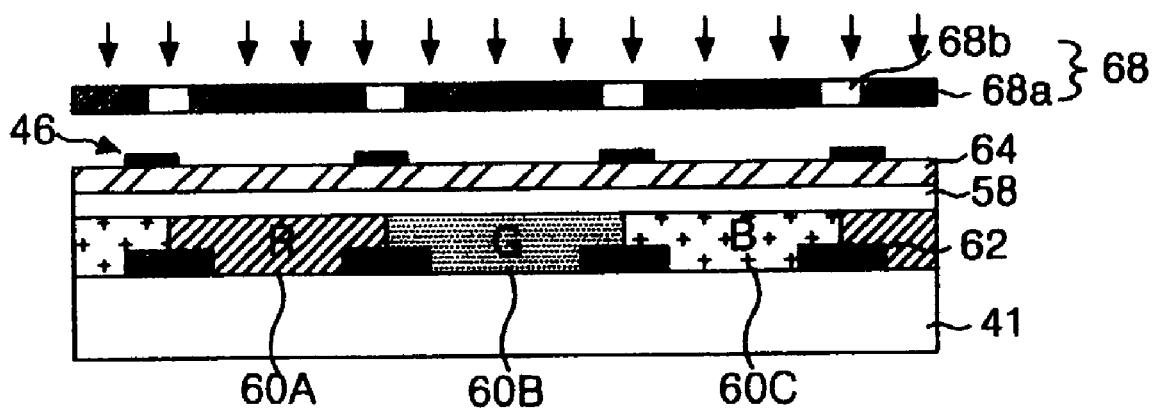
Figure 4A:
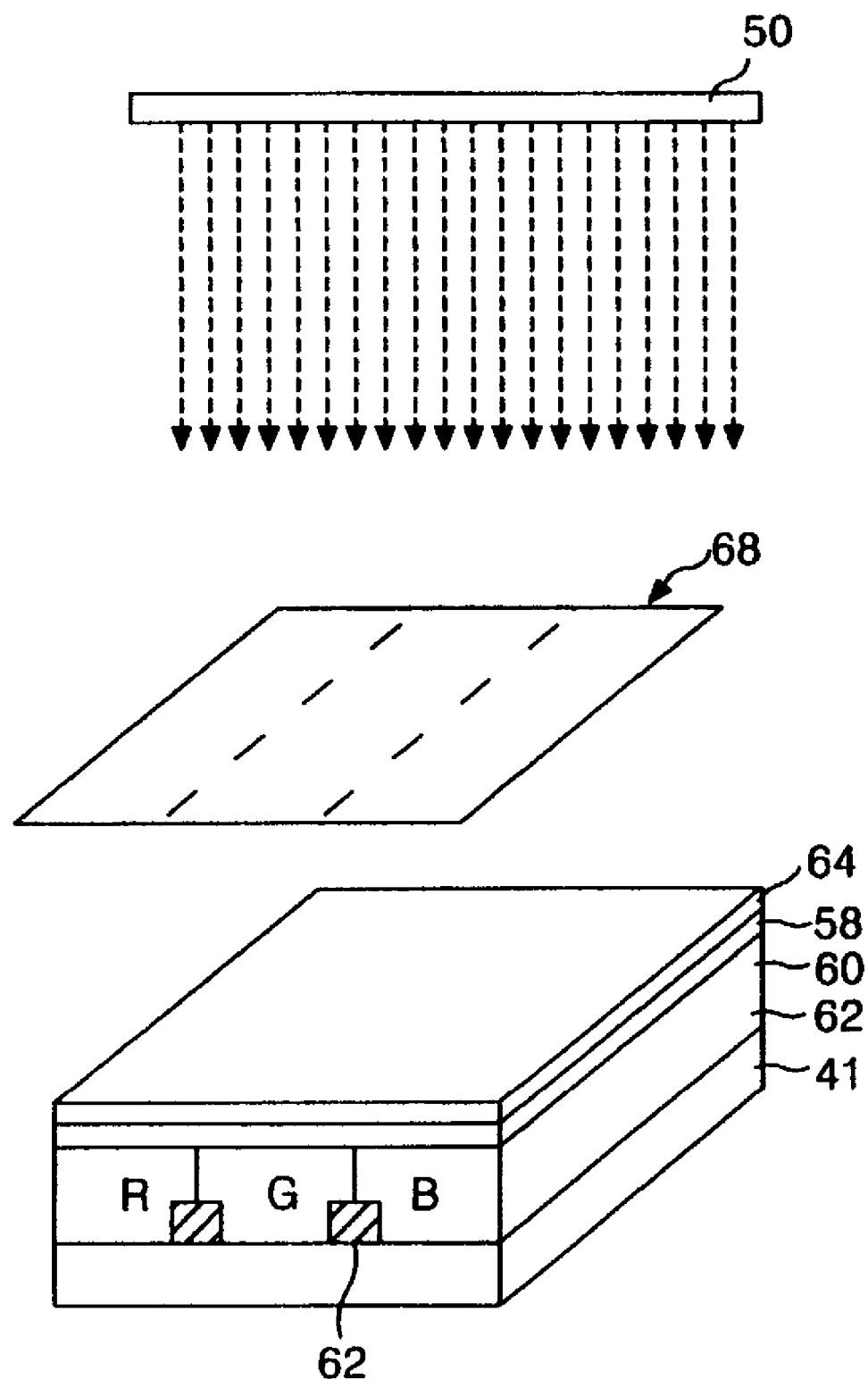
FIGS. 4a to 4c are views representing a fabricating method of a spacer of the liquid crystal display according to the first embodiment of the present invention.

Referring to FIGS. 3e and 4a, a mask 68 is aligned in the upper part of the upper substrate 41 where the upper alignment film 64 is formed.

The mask 68 includes a transmitting part 68b for transmitting the light generated by the light source 50, and a shielding part 68a for cutting off the light. The transmitting part 68b is located at the area corresponding to the black matrix 62 and has a width of about 1-10 µm (5 µm is desirable). The shielding part 68a is located at other areas of the mask 68, i.e. areas that do not correspond to the shielding part 68a. Herein, the light source 50 generates light or ions and may be, for example, an ion beam source, ultraviolet UV radiation source or laser.

Figure 3F:
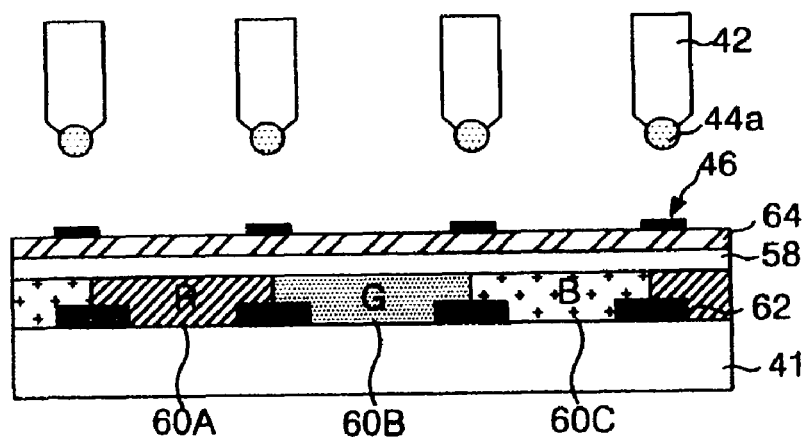
Figure 4B:
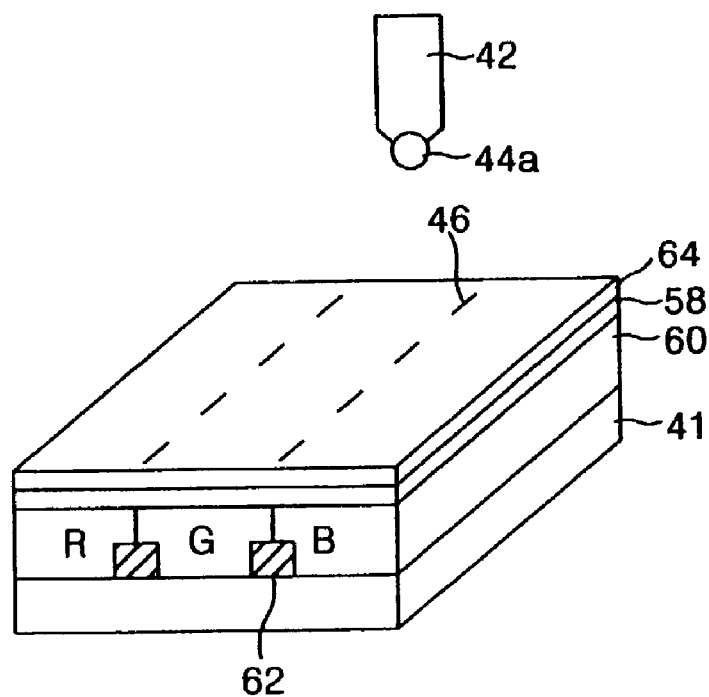

Referring to FIGS. 3f and 4b, a surface treated area 46 is formed in the upper alignment film 64 of the area corresponding to the black matrix 62 by the light transmitted through the transmitting part 68b of the mask 68. For example, if the surface treated area 46 is hydrophilic, the area except the surface treated area 46 is hydrophobic. Or, if the surface treated area 46 is hydrophobic, the area except the surface treated area 46 is hydrophilic.

After aligning an ink jet at the surface treated area, a spacer pattern 44a is dropped through a nozzle 42 of the ink jet head to be formed on the upper substrate 41 where the upper alignment film 64 is formed. The thickness and the shape of the spacer to be formed later are determined by the amount of the spacer pattern 44a deposited by the ink jet.

Figure 3G:
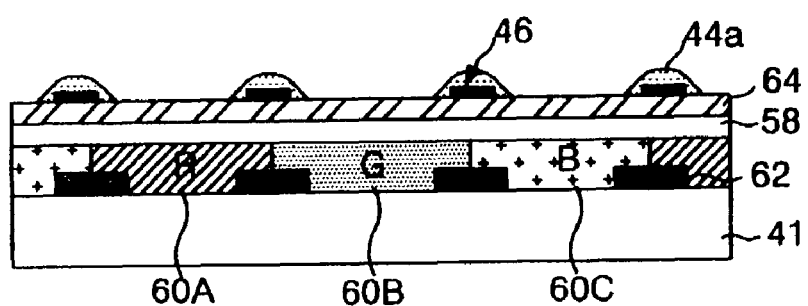

Referring to FIG. 3g, the spacer pattern 44a formed on the upper substrate 41 is broadly distributed to the area other than the surface treated area 46 due to the spread phenomenon. The surface treated area and the spacer pattern 44a are identically hydrophilic or hydrophobic. That is, a hydrophilic spacer pattern 44a formed on a hydrophilic surface treated area 46 has good adhesive strength and reactivity to the upper alignment film 64. On the other hand, a hydrophilic spacer pattern 44a formed on a hydrophobic surface treated area 46 has bad adhesive strength and reactivity to the upper alignment film 64. Similarly, a hydrophobic spacer pattern 44a formed on a hydrophobic surface treated area 46 has good adhesive strength and reactivity to the upper alignment film 64, but on the other hand, the hydrophobic spacer pattern 44a formed on the hydrophilic surface treated area 46 has bad adhesive strength and reactivity to the upper alignment film 64. This is to say that the adhesive strength and reactivity is substantially less for surface treated areas and spacer patterns having opposite hydro-characteristics than those having identical hydro-characteristics.

Figure 3H:
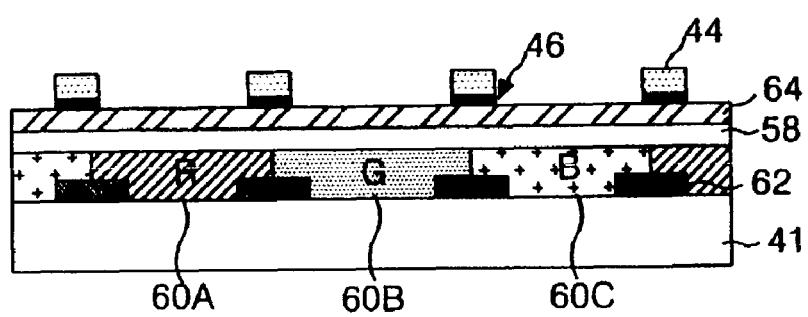
Figure 4C:
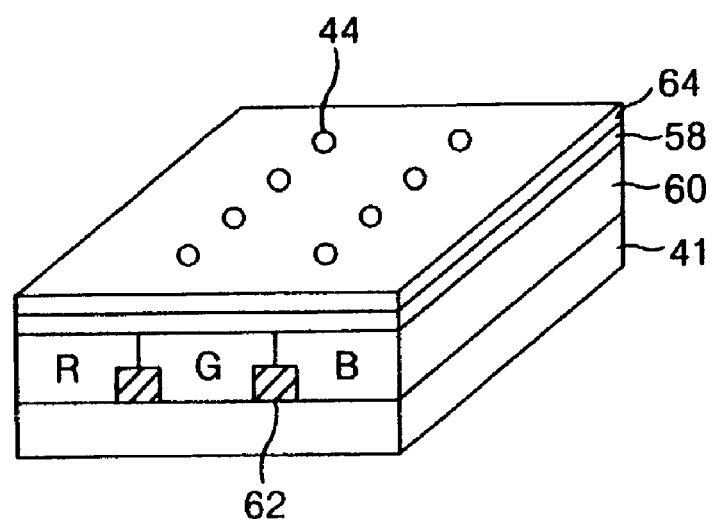

Referring to FIGS. 3h and 4c, the upper substrate 41, where the spacer pattern 44a is formed, is hardened when a specific temperature is applied. When hardening the spacer pattern 44a, the pattern naturally accumulates at the surface treated area 46. Thus, the spacer pattern 44a widely distributed to the area other than the surface treated area 46 moves to the surface treated area by tension to form a spacer 44 with a specific height.

FIG. 5a to 5h are sectional views representing a method of forming a spacer according to the second embodiment of the present invention.

Figure 5A:
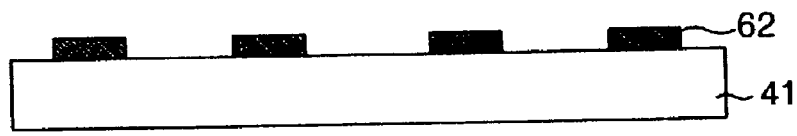
FIGS. 5a to 5h are sectional views representing a fabricating method of an upper plate according to the second embodiment of the present invention.

Referring to FIG. 5a, a black matrix 62 is formed on an upper substrate 41. For this, on the upper substrate 41 is deposited and patterned an opaque resin or an opaque metal such as chrome Cr. Subsequently, the opaque resin or the opaque metal layer are patterned by a photolithography process including an etching process to form the black matrix 62 on the upper substrate 41.

Figure 5B:
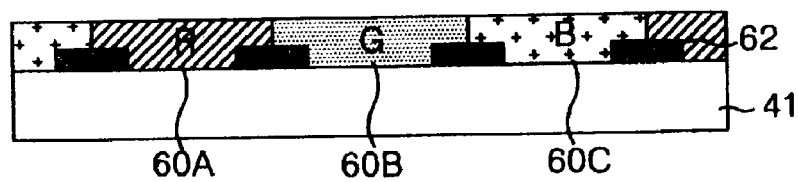

Referring to FIG. 5b, color filters 60a, 60b, 60c of the three primary colors are formed on the upper substrate 41 where the black matrix 62 is formed. For this, the color filters 30a, 30b, 30c of the three primary color are formed by spreading a material, which transmits light of a specific wavelength (red, green or blue), on the upper substrate 41 where the black matrix 62 is formed, and patterning the material.

Figure 5C:
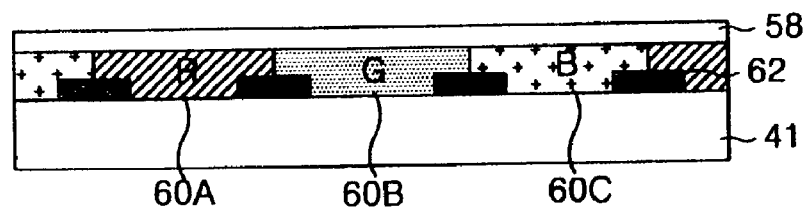

Referring to FIG. 5c, a common electrode 58 is formed on the upper substrate 41 where the color filters 60a, 60b, 60c are formed. For this, a transparent metal layer is deposited on the upper substrate 41, where the black matrix 62 and the color filters 60a, 60b, 60c are formed, to form the common electrode 58. Indium-tin-oxide ITO, indium-zinc-oxide IZO or indium-tin-zinc-oxide ITZO are examples of materials used as the transparent metal layer.

Figure 5D:
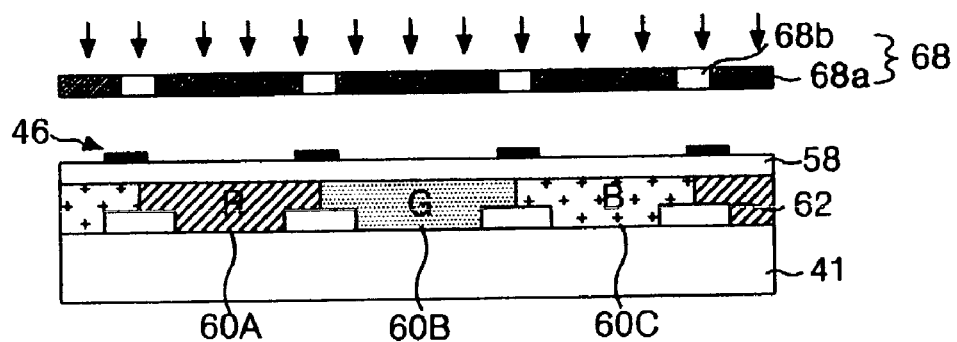

Referring to FIG. 5d, a mask 68 is aligned in the upper part of the upper substrate 41 where the common electrode 58 is formed.

The mask 68 includes a transmitting part 68b for transmitting the light generated at the light source 50, and a shielding part 68a for cutting off the light. The transmitting part 68b is located at the area correspond to the black matrix 62 and has a width of about 1-10 μm (5 μm is desirable). The shielding part 68a is located at the other area, that is the area that does not correspond to the black matrix 62. Herein, the light source 50 generates light or ions and may be, for example, an ion beam source, ultraviolet UV radiation source or laser.

Figure 5E:
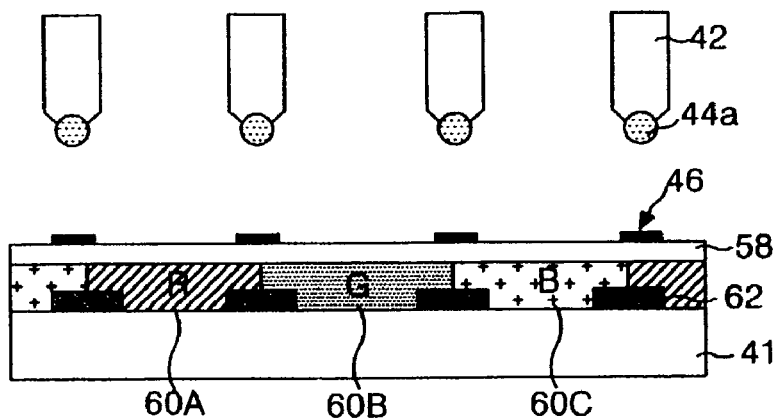

Referring to FIG. 5e, a surface treated area 46 is formed on the common electrode 58 of the area corresponding to the black matrix 62 by the light transmitted through the transmitting part 68b of the mask 68. For example, if the surface treated area 46 is hydrophilic, the area except the surface treated area 46 is hydrophobic. Similarly, if the surface treated area 46 is hydrophobic, the area except the surface treated area 46 is hydrophilic.

After aligning an ink jet at the surface treated area, spacer pattern 44a is sprayed through a nozzle 42 of the ink jet head to be formed on the upper substrate 41 where the common electrode 58 is formed. The thickness and the shape of the spacer to be formed later are determined by the amount of the spacer pattern 44a which is deposited by the ink jet.

Figure 5F:
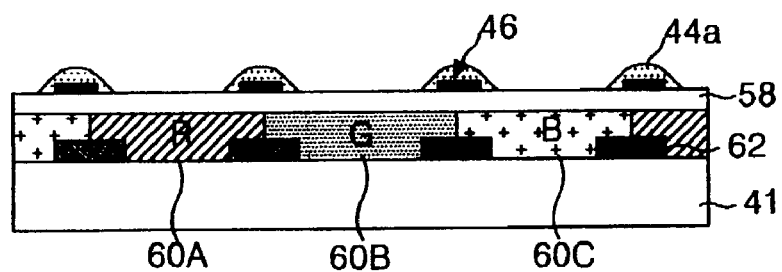

Referring to FIG. 5f, the spacer pattern 44a formed on the upper substrate 41 is broadly distributed on the area other than the surface treated area 46 due to a spreading phenomenon. The surface treated area and the spacer pattern 44a are identically hydrophilic or hydrophobic. That is, the hydrophilic spacer pattern 44a formed on the hydrophilic surface treated area 46 has good adhesive strength and reactivity to the common electrode 58, but on the other hand, the hydrophilic spacer pattern 44a formed on the hydrophobic surface treated area 46 has bad adhesive strength and reactivity to the common electrode 58. Similarly, the hydrophobic spacer pattern 44a formed on the hydrophobic surface treated area 46 has good adhesive strength and reactivity to the common electrode 58, but on the other hand, the hydrophobic spacer pattern 44a formed on the hydrophilic surface treated area 46 has bad adhesive strength and reactivity to the common electrode 58.

Figure 5G:
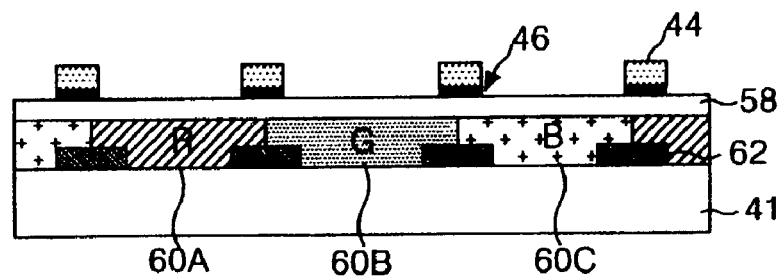

Referring to FIG. 5g, the upper substrate 41, where the spacer pattern 44a is formed, is hardened at a specific temperature. When hardening the spacer pattern 44a, the spacer pattern 44a that was widely distributed to the area other than the surface treated area 46 moves to the surface treated area by tension to form a spacer 44 with a specific height.

Figure 5H:
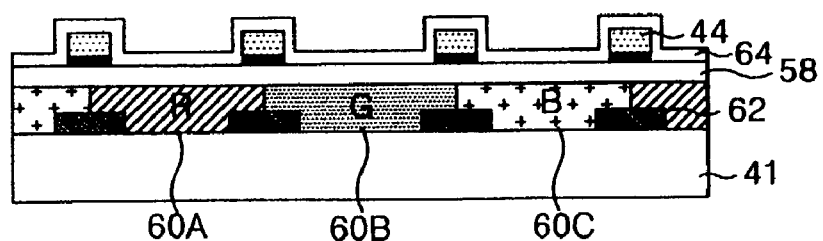

Referring to FIG. 5h, the upper alignment film 64 is formed by spreading polyimide on the entire surface of the upper substrate 41, where the spacer 44 with the specific height is formed.

As described above, the method of fabricating the liquid crystal display according to the present invention has surface treatment applied to the area where the spacer is to be formed by, for example an ion beam, ultraviolet radiation or a laser beam. The shape and height of the spacer can be controlled as the spacer at the surface treated area is formed using the ink jet. Also, because the ink jet is positioned at the surface treated area, it becomes easier to align the ink jet, thereby forming the spacer at the desired position accurately.

Also, because the surface treated area and the spacer material are identically hydrophilic or hydrophobic, the spacer can be accurately formed since the spacer material gathers into the surface treated area even though the ink jet may be a little misaligned. In addition, by using the ink jet to form the spacer at the desired position, the fabricating cost of the spacer can be reduced in comparison with the fabricating process of the conventional column spacer.

Although the present invention has been explained by the embodiments shown in the drawings described above, it should be understood to the ordinary skilled person in the art that the invention is not limited to the embodiments, but rather that various changes or modifications thereof are possible without departing from the spirit of the invention. Accordingly, the scope of the invention shall be determined only by the appended claims and their equivalents.

What is claimed is:

1. A method of fabricating a liquid crystal display, comprising:

forming a black matrix on a substrate;

forming a color filter on the substrate where the black matrix is formed;

forming a common electrode on the substrate where the color filter is formed;

forming an alignment film on the substrate where the common electrode is formed;

aligning a mask having a transmissive part on the substrate where the alignment film is formed;

directly applying light to a portion of the alignment film corresponding to the black matrix through the transmissive part of the mask to form a surface treated area which has a surface property different from the other portion of the alignment film;

depositing a spacer material at the surface treated area, wherein the spacer material is deposited at the surface treated area using an ink jet head nozzle, wherein a property of the space material is the same as the surface property of the surface treated area;

forming a spacer by hardening the spacer material; and subsequently introducing a liquid crystal material over the substrate.

2. The method according to claim 1, further comprising aligning the mask such that the transmitting part of the mask is located over the portion of the alignment film corresponding to the black matrix and a shielding part of the mask is located over an area other than the portion of alignment film corresponding to the black matrix.

3. The method according to claim 2, wherein a width of the transmitting part of the mask is approximately 1-10 µm.

4. The method according to claim 3, wherein the width of the transmitting part of the mask is approximately 5 µm.

5. The method according to claim 1, wherein the surface property of the surface treated area has a hydrophilic or hydrophobic property.

* * * * *